United States Patent

Scott et al.

[15] 3,650,732

[45] Mar. 21, 1972

[54] PROCESSING OF FERROPHOSPHORUS

[72] Inventors: Milton J. Scott; Jurgen A. Stenzel, both of St. Louis, Mo.

[73] Assignee: Monsanto Company, St. Louis, Mo.

[22] Filed: Oct. 17, 1969

[21] Appl. No.: 867,398

[52] U.S. Cl. .................................75/129, 23/204, 75/135
[51] Int. Cl. ...................................C22c 33/00, C01b 25/08
[58] Field of Search....................75/129, 132, 135; 23/204 R

[56] References Cited

UNITED STATES PATENTS

| | | | |
|---|---|---|---|
| 3,423,218 | 1/1969 | Gruber | 23/204 X |
| 3,190,750 | 6/1965 | Staggers et al. | 75/129 X |
| 1,834,770 | 12/1931 | Lambert | 75/132 X |
| 2,966,424 | 12/1960 | Ruehrwein et al. | 23/204 |

OTHER PUBLICATIONS

Phosphorus and its Compounds, Vol. I, Science Publishers, Inc., New York, page 180.

*Primary Examiner*—L. Dewayne Rutledge
*Assistant Examiner*—G. K. White
*Attorney*—Herbert B. Roberts, Roger R. Jones, Thomas N. Wallin and Neal E. Willis

[57] ABSTRACT

Ferrophosphorus is heated in admixture and excess aluminum to convert the phosphorus therein to aluminum phosphide. The aluminum phosphide is hydrolyzed and an alloy comprising the nonphosphorus constituents of the ferrophosphorus and unreacted aluminum is separated from the hydrolysis products. The alloy of non-phosphorus constituents and aluminum is useful in the metallurgical industry and the phosphine obtained during the hydrolysis reaction has well-known utility as a chemical intermediate, for example, in preparing gasoline additives such as tributyl phosphine.

5 Claims, No Drawings

PROCESSING OF FERROPHOSPHORUS

BACKGROUND OF THE INVENTION

This invention relates to a method of processing ferrophosphorus and particularly to a method of separating the nonphosphorus constituents of ferrophosphorus from the phosphorus contained therein. Ferrophosphorus is a byproduct of the well-known electric furnace processes for production of elemental phosphorus. Depending upon the compositions of ore fed to the furnace, the ferrophosphorus generally consists of 20–30 percent phosphorus, from 55–90 percent iron and, in some instances, varying amounts of chromium, vanadium, titanium, manganese, nickel and silica. The ferrophosphorus as such is much less valuable than the individual constituents thereof. Accordingly, methods of separating phosphorus from the non-phosphorus constituents of ferrophosphorus have been extensively studied but such methods have generally proven to be so high in cost as to severely limit their economic attractiveness. In some instances, known dephosphorizing procedures convert metallic components to oxides of limited value.

It has, for some time, been recognized in the industry that an economically attractive procedure for processing ferrophosphorus to segregate the nonphosphorus and phosphorus constituents thereof would represent a significant contribution to the art.

SUMMARY OF THE INVENTION

It is an object of this invention to provide methods of separating phosphorus and nonphosphorus constituents of ferrophosphorus into commercially utilizable products.

This is accomplished by heating ferrophosphorus in admixture with excess aluminum to convert the phosphorus therein to aluminum phosphide, hydrolyzing the aluminum phosphide and separating non-phosphorus constituents from the hydrolysis products as hereinafter described. The invention will be better understood from the following description of the preferred embodiments.

DESCRIPTION OF THE PREFERRED EMBODIMENTS

Any of the ferrophosphorus byproducts commonly obtained in manufacturing elemental phosphorus by electric furnace processes can be used in the practice of this invention. As is known to those familiar with the phosphorus industry, "ferrophosphorus" is a generic term which designates a mixture of iron phosphides having a composition depending on the composition, the ore and furnace operating conditions. In addition to iron and from 20 to 30 percent, usually 23 to 28 percent by weight phosphorus, the ferrophosphorus may contain from small amounts, up to about 6 percent silicon, up to 10 percent vanadium, up to 10 percent chromium, and minor amounts of other metals such as nickel, manganese and titanium. These ingredients may be present as phosphides, intermetallic compounds, or in elemental form.

In the process of this invention, the phosphorus content of ferrophosphorus is converted to aluminum phosphide by heating the ferrophosphorus in admixture with excess aluminum.

The use of high purity aluminum in the practice of this invention is not required. Satisfactory results are economically obtained from the use of aluminum scrap or reclaimed aluminum inasmuch as aluminum oxides and similar contaminants present in such material are not found to interfere with the reaction.

It is critical that an excess of aluminum be employed in the practice of this invention in order to convert substantially all of the phosphorus content of the ferrophosphorus to aluminum phosphide. The exact quantity of aluminum required may vary somewhat depending upon the ferrophosphorus composition, however, a quantity exceeding that stoichiometrically required for conversion of the phosphorus to aluminum phosphide by 35 percent by weight of the nonphosphorus components of the ferrophosphorus is generally sufficient to effect substantially complete conversion. As little as 25 percent excess (as defined above) aluminum is sufficient to convert a major portion of the phosphorus values to aluminum phosphide. However, the higher level of unreacted ferrophosphorus residue associated with the metal constituents will render such constituents less valuable when segregated as hereinafter described.

In the practice of the invention, solid aluminum can be added to molten ferrophosphorus, solid ferrophosphorus can be added to molten aluminum, molten ferrophosphorus and aluminum can be intermixed in any order or solid ferrophosphorus and aluminum can be combined prior to heating.

In order for the conversion of phosphorus to aluminum phosphide to take place at an acceptable rate, the mixture must be heated to a temperature at least sufficient to render the aluminum molten, e.g., about 660° C. Preferably, the mixture will be heated to a temperature at least sufficient to render substantially the entire system molten. As recognized by those skilled in the art, the exact temperature required for the purpose will vary somewhat depending upon the composition of the mixture, but temperatures from 1,300° to 1,500° C. are usually sufficient. There is no theoretical upper temperature limit, however, for reasons of economy temperatures greatly in excess of that required to render the mixture molten are generally not considered advantageous.

In order to prevent oxidation of constituents of the mixture, the heating is conducted under an inert atmosphere. The term "inert" is used broadly to encompass gases not reactive with mixture constituents and is not limited to totally chemically inert gases. Thus, in addition to helium, argon, etc., the "inert" atmosphere can comprise gases such as hydrogen and the like.

Following the reactions described above, the aluminum phosphide is hydrolyzed. This can be conveniently accomplished by cooling the mixture (to prevent unduly vigorous evolution and/or decomposition of phosphine) and introducing it into water. This results in evolution of phosphine gas (heat can be applied to liberate dissolved phosphine, if desired) which can be utilized as an intermediate for preparation of various organo phosphine products, leaving a slurry comprising aluminum hydroxide and an alloy of the iron, other nonphosphorus constituents of the ferrophosphorus, excess aluminum, and, depending on the quantity of aluminum utilized, unreacted ferrophosphorus. Alternatively, steam can be utilized to effect hydrolysis or an acidic or basic solution used to yield soluble hydrogen products. If desired, the aluminum hydroxide can be conveniently separated by classifiers, effecting separation by differences in sedimentation rate of the alloy and aluminum hydroxide. Alternatively, the aluminum hydroxide can be converted to soluble salts by reaction with acids or bases and the alloy separated by filtration, decantation or the like.

It is generally desired to coalesce the alloy by remelting in the presence of a flux. The flux may be any material capable of reacting with or dissolving the aluminum oxide formed during the hydrolysis step. Of course, the flux should be nonreactive with the metal constituents. Suitable fluxes include calcium fluoride, sodium aluminum fluoride, calcium oxide and magnesium oxide. Those skilled in the metal art will recognize that the ingredients of this alloy render it useful, for example, as an additive in steel production. The aluminum in the alloy serves as a deoxidant for steel and the chromium and vanadium values are desirable alloy ingredients for high quality steels. In some instances, a significant phosphorus content in the alloy (which will result from the use of less aluminum than required for substantially complete phosphorus removal) can be tolerated for specific metallurgical application, e.g., production of phosphorus containing steels characterized by reduced ductility.

It is an advantage of this invention that the nonphosphorus ingredients of the ferrophosphorus are recovered in elemental form rather than as oxides such as produced by many previously known dephosphorization procedures.

The practice of the invention is further illustrated by the following examples.

EXAMPLE I

About 100 grams of ferrophosphorus lumps assaying about 26% phosphorus, about 68.5% iron, about 2% manganese, about 3.45% silica, and about 0.05% nickel is admixed with about 65 grams aluminum.

The mixture is melted to a substantially homogeneous mixture at about 1,350° C. under a argon atmosphere.

The mix is then cooled and added to excess ice water. There is an evolution of phosphine gas leaving a slurry of metal powder and aluminum hydroxide. The aluminum hydroxide and metal are separated using a laboratory scale sedimentation rate type classifier. The metal assays about 65% iron and about 27% aluminum with the balance consisting of manganese, silicon, nickel, and less than 1.5% phosphorus.

EXAMPLE II

The procedure of Example I is repeated with the exception that only 25 gms aluminum is utilized. The metal powder separated following the hydrolysis contains over 15 percent phosphorus. Thus, it is seen that the use of a substantial excess of aluminum is required to recover major proportions of the phosphorus values present in ferrophosphorus.

What is claimed is:

1. A method of processing ferrophosphorus comprising the steps of:
    a. admixing said ferrophosphorus with a quantity of aluminum exceeding that stoichiometrically required for conversion of the phosphorus in said ferrophosphorus to aluminum phosphide by at least 25 percent by weight of the nonphosphorus constituents of said ferrophosphorus,
    b. heating the mixture under an inert atmosphere to a temperature of at least 660° C. and converting phosphorus in said ferrophosphorus to aluminum phosphide, and
    c. hydrolyzing said aluminum phosphide.

2. The method of claim 1 wherein the mixture of aluminum and ferrophosphorus is heated to a temperature at least sufficient to render substantially the entire mixture molten.

3. The method of claim 2 wherein the aluminum admixed with the ferrophosphorus exceeds that stoichiometrically required for conversion of the phosphorus in said ferrophosphorus to aluminum phosphide at 35 percent by weight of the nonphosphorus constituents of said ferrophosphorus.

4. The method of claim 3 further comprising the step of separating the nonphosphorus constituents of said ferrophosphorus and unreacted aluminum from the hydrolysis products.

5. The method of claim 4 further comprising the step of coalescing the nonphosphorus constituents of said ferrophosphorus by melting said constituents in the presence of a flux.

* * * * *